United States Patent
Yang et al.

(10) Patent No.: US 9,300,853 B2
(45) Date of Patent: Mar. 29, 2016

(54) NETWORK CAMERA DATA MANAGEMENT SYSTEM AND MANAGING METHOD THEREOF

(71) Applicant: AMARYLLO INTERNATIONAL, INC., Hsinchu County (TW)

(72) Inventors: Chao-Tung Yang, Hsinchu County (TW); Kuang-Jui Cheng, Hsinchu County (TW); Wen-Kuang Lin, Hsinchu County (TW)

(73) Assignee: AMARYLLO INTERNATIONAL INC., Hsinchu County (TW)

( * ) Notice: Subject to any disclaimer, the term of this patent is extended or adjusted under 35 U.S.C. 154(b) by 39 days.

(21) Appl. No.: 14/525,610

(22) Filed: Oct. 28, 2014

(65) Prior Publication Data
US 2015/0381875 A1    Dec. 31, 2015

(30) Foreign Application Priority Data
Jun. 26, 2014 (TW) .............................. 103122179 A

(51) Int. Cl.
*H04N 7/173* (2011.01)
*H04N 5/232* (2006.01)
*H04N 5/265* (2006.01)

(52) U.S. Cl.
CPC ........... *H04N 5/23206* (2013.01); *H04N 5/265* (2013.01)

(58) Field of Classification Search
CPC ..................................................... H04N 21/222
USPC ....................................... 348/207.3; 725/105
See application file for complete search history.

(56) References Cited

U.S. PATENT DOCUMENTS

| 5,113,496 | A | * | 5/1992 | McCalley | ........... H04M 11/085 340/2.1 |
| 6,070,228 | A | * | 5/2000 | Belknap | ............ G06F 17/30017 707/E17.009 |

* cited by examiner

*Primary Examiner* — Joel Fosselman
(74) *Attorney, Agent, or Firm* — WPAT, P.C.; Anthony King

(57) ABSTRACT

Disclosed is a network camera data management system for managing camera data of a network camera, including: a data importing device, a splitting and storing device, and a data retrieving device. A management method utilized by the network camera data management system includes the steps of: splitting the imported camera data into a camera audio data and a camera video data based on the respective data formats; storing the camera audio data and the camera video data respectively in different servers and/or in different server storage areas that have non-sequential storage addresses with each other in one server; and retrieving, according to a retrieval condition, a fragment of the camera audio data and/or a fragment of the camera video data from the camera audio data and/or the camera video data stored.

7 Claims, 4 Drawing Sheets

NETWORK CAMERA DATA MANAGEMENT SYSTEM AND MANAGING METHOD THEREOF

FIELD OF THE INVENTION

The present invention relates to a network camera, and more particularly to a network camera data management system and a management method thereof.

BACKGROUND OF THE INVENTION

With the development of network technology, network cameras have become increasingly popular and been widely used in security surveillance, home care and the like. A user is able to view camera data on his/her personal computer or smart phone in real time by connecting a network camera to a network at home, office, or even outdoors.

In addition to a real-time viewing function, some network cameras are also provided with a function of transmitting and storing camera data online, that is, the camera data can be uploaded to and stored in a storage space in a server provided by an individual or a vendor, thereby enabling a user to retrieve, view and edit the uploaded data in the future.

However, no matter a network camera is used for security surveillance, home care or for any other purposes, the camera data acquired usually contains both video and audio data. Hence, the data size is considerable. In such a case, a user inevitably needs to prepare an enormous storage space to store the huge-sized camera data. It also causes difficulty for a system to fully support the processes of retrieving, viewing and editing data. Consequently, the system's overall performance of execution is deteriorated, resulting in such issues as low processing speed and poor quality.

SUMMARY OF THE INVENTION

In view of the above, conventional technology still has some disadvantages in storing, retrieving, viewing and editing camera data, which consequently result in such issues as low processing speed and poor quality.

Accordingly, an object of the present invention is to provide a network camera data management system and a management method thereof for managing camera data of a network camera more efficiently.

The present invention provides a network camera data management system for managing camera data of a network camera, comprising: a data importing device which is connected with the network camera and is for importing the camera data of the network camera; a splitting and storing device which is connected with the data importing device and is for splitting the imported camera data into a camera audio data and a camera video data based on the respective data formats, and storing, via a network, the camera audio data and the camera video data respectively in different servers and/or in different server storage areas that have non-sequential storage addresses with each other in one server; and a data retrieving device which is connected with the servers and/or the server storage areas and is for retrieving, according to a retrieval condition, a fragment(s) of the camera audio data and/or a fragment(s) of the camera video data from the camera audio data and/or the camera video data stored in the servers and/or the server storage areas.

According to one embodiment of the present invention, the network camera data management system further comprises a data merging device connected with the data retrieving device for merging the fragment(s) of the camera audio data and/or the fragment(s) of the camera video data.

According to one embodiment of the present invention, the retrieval condition is a time point, a video content, or an audio content.

Further, the present invention also provides a network camera data management method for managing camera data of a network camera, comprising the steps of: (a) importing the camera data of the network camera; (b) splitting the imported camera data into a camera audio data and a camera video data based on the respective data formats, and storing, via a network, the camera audio data and the camera video data respectively in different servers and/or in different server storage areas having non-sequential storage addresses with each other in one server; and (c) retrieving, according to a retrieval condition, a fragment of the camera audio data and/or a fragment of the camera video data from the camera audio data and/or the camera video data stored in the servers and/or the server storage areas.

According to one embodiment of the present invention, in the step (a), the camera data of the network camera is synchronously imported while the network camera is recording.

According to one embodiment of the present invention, the network camera data management method further comprises, after the step (c), a step (d) of: merging the retrieved fragment of the camera audio data and the retrieved fragment of the camera video data into a fragment camera data.

According to one embodiment of the present invention, the network camera data management method further comprises, after the step (c), a step (d) of: merging the retrieved fragments of the camera audio data into a continuous-time camera audio data, and/or merging the retrieved fragments of the camera video data into a continuous-time camera video data.

By means of technical means of the present invention, the huge-sized camera data can be split into two parts including an audio part, i.e., the camera audio data and a video part, i.e., the camera video data so as to minimize data in a way that the data can be stored in different servers and/or different server storage areas which are independent to each other in one server. Efficient use of space is thus achieved. Further, by means of data miniaturization and distributed storage, the processes can be respectively executed by multiple server systems to thus enhance the performance of system. Accordingly, camera data management is implemented at a faster speed and with a better quality.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Embodiments are described in detail below with reference to the FIG. 1 to FIG. 4, and the description is used for explaining the embodiments of the present invention only, but not for limiting the scope of the claims.

Figure 1:
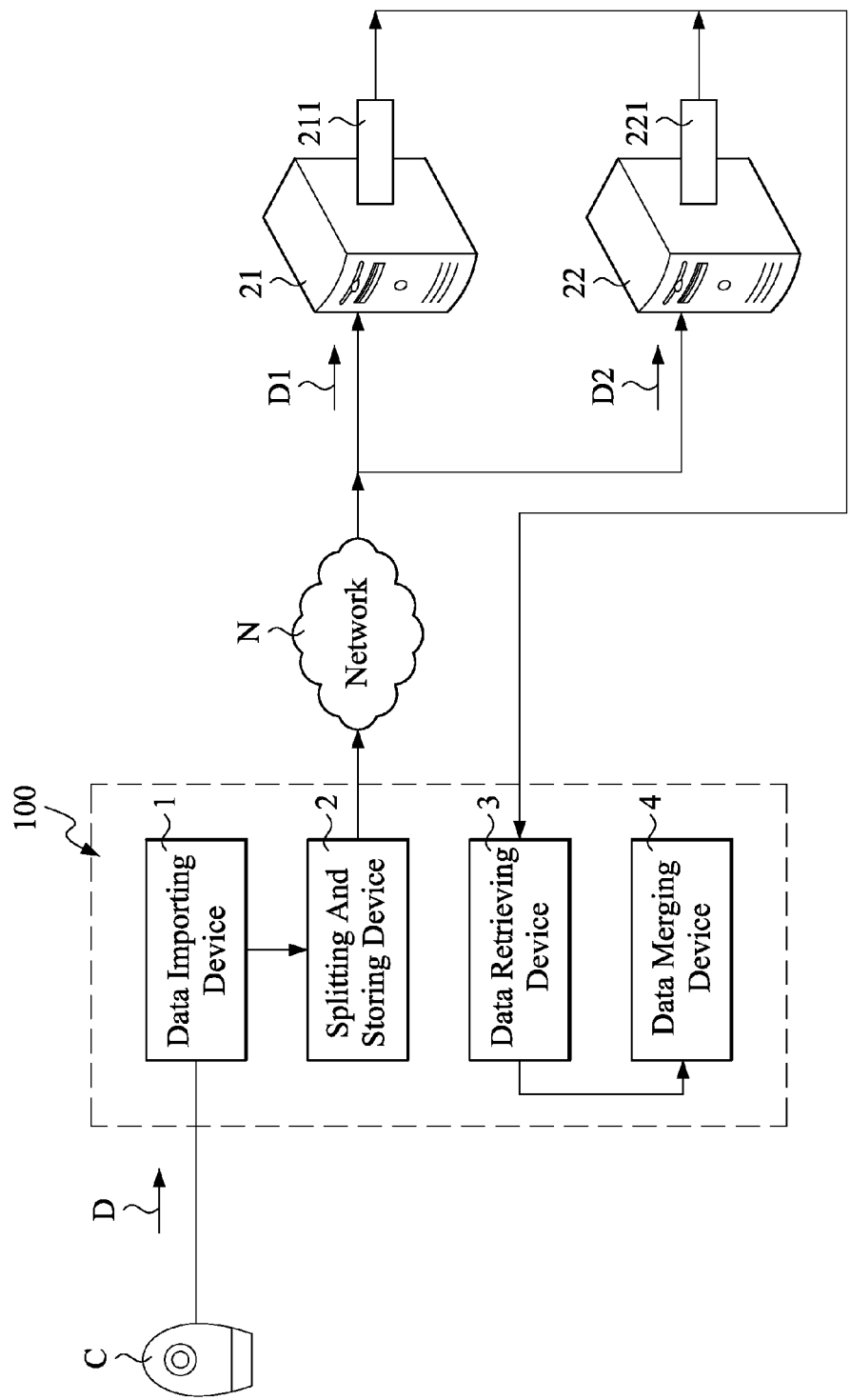
FIG. 1 is a block diagram illustrating a network camera data management system according to one embodiment of the present invention.
Figure 4:
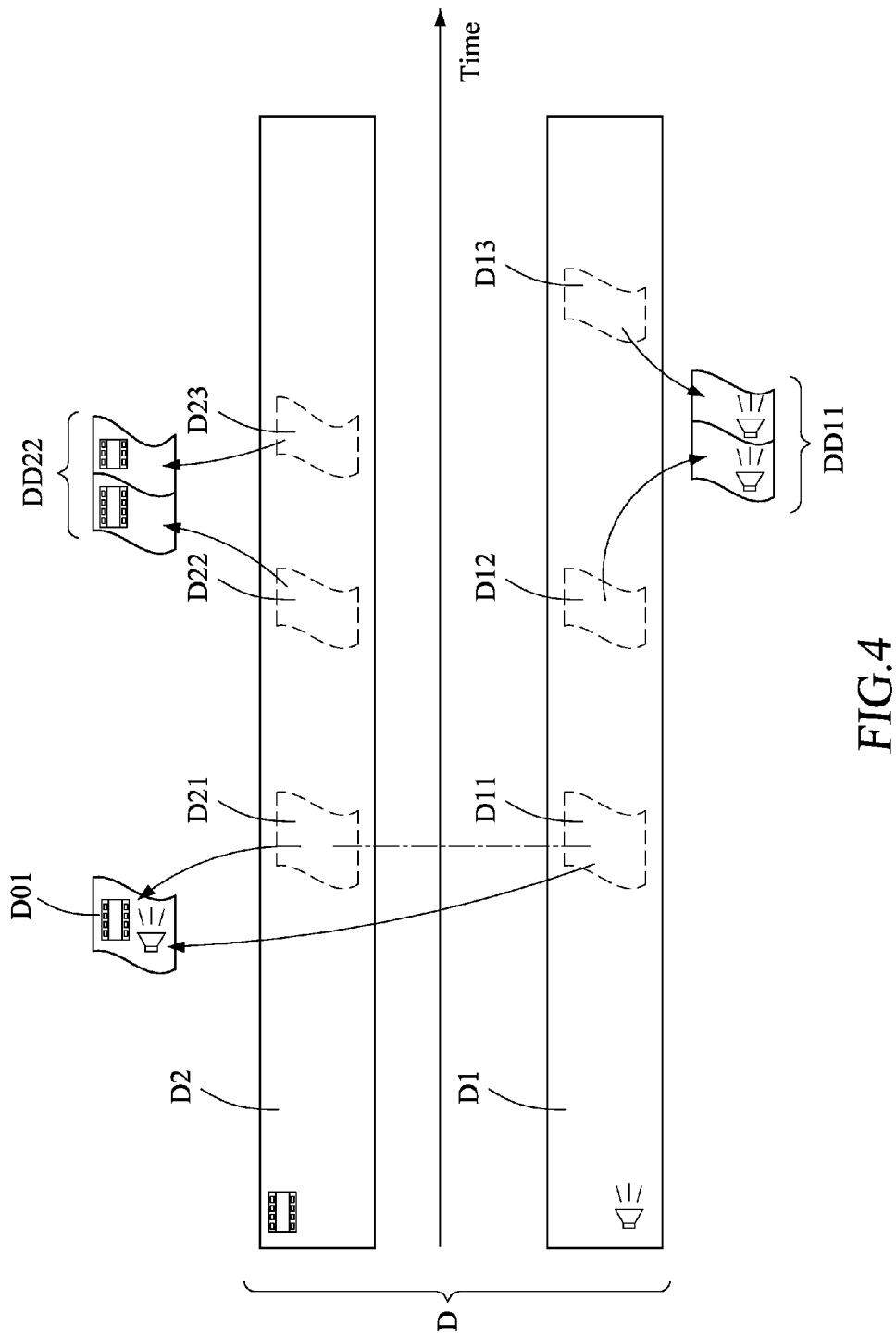
FIG. 4 is a schematic diagram illustrating splitting and merging camera data by means of the network camera data management method according to one embodiment of the present invention.

As shown in FIG. 1 and FIG. 4, a network camera data management system 100 according to one embodiment of the present invention is for managing camera data D of a network camera C. The network camera data management system 100 comprises: a data importing device 1 which is connected with the network camera C and for importing the camera data D of the network camera C; a splitting and storing device 2 which is connected with the data importing device 1 and is for splitting the imported camera data D into a camera audio data D1 and a camera video data D2 based on the respective data formats, and storing, via a network, the camera audio data D1 and the camera video data D2 respectively in different servers 21 and 22 and/or in different server storage areas 211 and 212 which have non-sequential storage addresses with each other in one server 21; and a data retrieving device 3 which is connected with the servers 21 and 22 and/or the server storage areas 211 and 212 and is for retrieving, according to a retrieval condition, fragments D11, D12, and D13 of the camera audio data D1 and/or fragments D21, D22 and D23 of the camera video data D2 from the camera audio data D1 and/or the camera video data D2 stored in the servers 21 and 22 and/or the server storage areas 211 and 212.

In the network camera data management system 100, the data importing device 1 and the splitting and storing device 2 can be provided as built-in parts of the network camera C. However, the present invention is not limited to this. In other embodiments, the data importing device 1 and the splitting and storing device 2 can be connected to the network camera C externally. Moreover, in the embodiment shown in FIG. 1, the network camera data management system 100 further includes a data merging device 4 connected with the data retrieving device 3 and used for merging the fragments D11, D12 and D13 of the camera audio data D1 and/or the fragments D21, D22, D23 of the camera video data D2.

Figure 2:
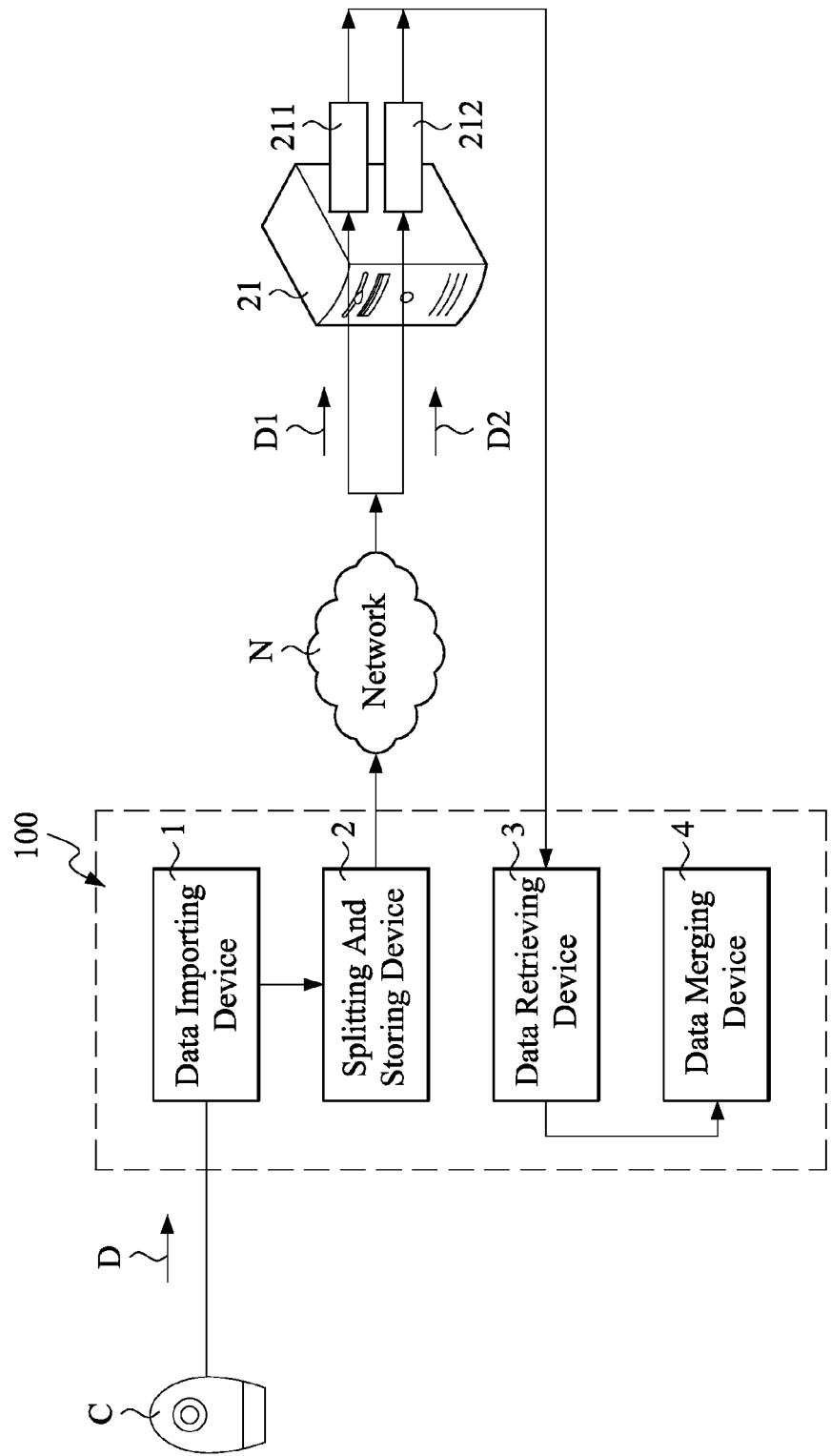
FIG. 2 is a block diagram illustrating a network camera data management system according to another embodiment of the present invention.
Figure 3:
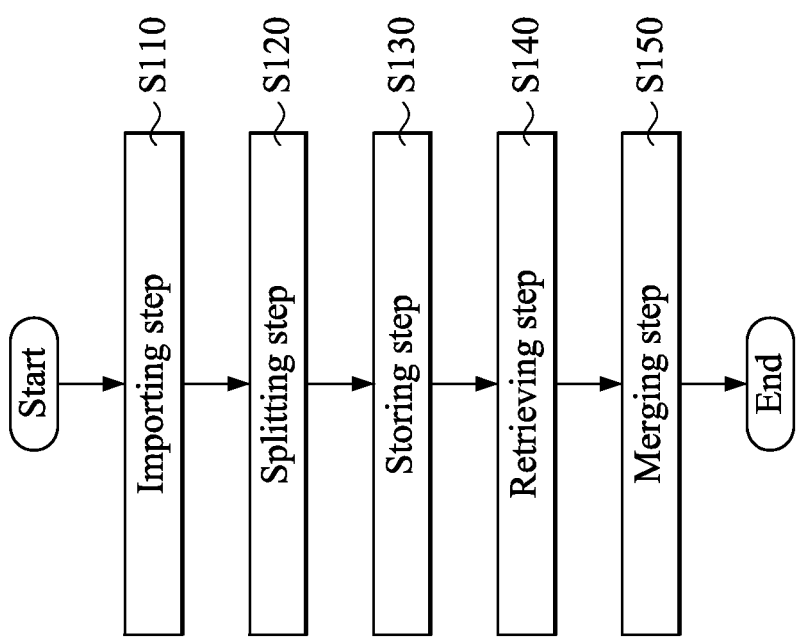
FIG. 3 is a flowchart diagram illustrating a network camera data management method according to one embodiment of the present invention.

Next, as shown in FIG. 3, a network camera data management method according to one embodiment of the present invention will be described with reference to FIGS. 1, 2 and 4.

Firstly, camera data D of a network camera C is imported by the data importing device 1 (step S110). Preferably, the camera data D of the network camera C is synchronously imported while the network camera C is recording so as to prevent the camera data D from hoarding at the network camera side that leads to insufficient storage space and low efficiency.

Next, the imported camera data D is transmitted from the data importing device 1 to the splitting and storing device 2, and then is split into a camera audio data D1 and a camera video data D2 based on the respective data formats (step S120). Specifically, the step of splitting the data based on the respective data formats is to separate the audio part and the video part from the entire camera data D so as to have smaller data size while maintaining the complete data for fitting into the storage areas to be stored therein subsequently.

Next, the camera audio data D1 and the camera video data D2 are transmitted from the splitting and storing device 2 via a wired/wireless network N to the servers 21 and 22 and/or to the server storage areas 211 and 212 that have non-sequential addresses with each other (step S130). In other words, the camera audio data D1 and the camera video data D2 are stored respectively in different storage areas instead of the same storage area. For example, when the camera audio data D1 is stored in a server storage area 211 of the server 21, the camera video data D2 can be stored in a server storage area 221 of the different server 22, as shown in FIG. 1. As another example, when the camera audio data D1 is stored in the server storage area 211 of the server 21, the camera video data D2 can be stored in the different server storage area 212 of the same server 21. By such storing manner, the data can be distributed to various different storage spaces so as to achieve efficient use of space and reduce the burden on a single server/storage space to thereby effectively improve the data management efficiency.

Next, when a use has a demand for retrieving data, a retrieval condition may be inputted to have fragments D11, D12 and D13 of the camera audio data D1 and/or fragments D21, D22 and D23 of the camera video data D2 retrieved, by the data retrieving device 3, from the camera audio data D1 and/or the camera video data D2 stored in the servers 21 and 22 and/or the server storage areas 211 and 212 (step S140.) The retrieval condition can be a point of time, a video content, or an audio content of the camera data D. For example, for an event happening at a time point, a person, an object, or a motion, and dialog, sound, or background noise that may appear in the event can be used as a retrieval condition for retrieving a specific event. According to the retrieval condition, the data retrieving device 3 performs the retrieve via the servers 21 and 22. The result can be a fragment D11, D12 or D13 of the camera audio data D1 and/or a fragment D21, D22 or D23 of the camera video data D2, i.e., a portion of the camera audio data D1 and/or a portion of the camera video data D2. Since the retrieval process can be preferably executed or shared executed by respective servers, the processing speed can be improved.

Furthermore, after the data is retrieved, the retrieved fragments D11, D12 and D13 of the camera audio data D1 and the retrieved fragments D21, D22 and D23 of the camera video data D2 can be merged by the data merging device 4. For example, as shown in FIG. 4, the fragment D11 of the camera audio data D1 and the fragment D21 of the camera video data D2 of the same time segment can be merged by the data merging device 4 into a fragment camera data D01, the fragments D12 and D13 of the camera audio data D1 from different time sections can be merged by the data merging device 4 into a continuous-time camera audio data DD11, and the fragments D22 and D23 of the camera video data D2 from different time segments can be merged by the data merging device 4 into a continuous-time camera video data DD22. Therefore, retrieval results of fragments can be merged for the convenience of the user to observe and edit.

The above description should be considered as only the discussion of the preferred embodiments of the present invention. However, a person with an ordinary skill in the art may make various modifications to the present invention. Those modifications still fall within the spirit and scope defined by the appended claims.

What is claimed is:

1. A network camera data management system for managing camera data of a network camera, comprising:
   a data importing device which is connected with the network camera and is for importing the camera data of the network camera;
   a splitting and storing device which is connected with the data importing device and is for splitting the imported camera data into a camera audio data and a camera video data based on the respective data formats, and storing, via a network, the camera audio data and the camera video data respectively in different servers and/or in different server storage areas that have non-sequential storage addresses with each other in one server; and a data retrieving device which is connected with the servers and/or the server storage areas and is for retrieving, according to a retrieval condition, a fragment(s) of the camera audio data and/or a fragment(s) of the camera video data from the camera audio data and/or the camera video data stored in the servers and/or the server storage areas.

2. The network camera data management system as claimed in claim 1, further comprising a data merging device connected with the data retrieving device for merging the fragment(s) of the camera audio data and/or the fragment(s) of the camera video data.

3. The network camera data management system as claimed in claim 1, wherein the retrieval condition is a time point, an video content, or an audio content.

4. A network camera data management method for managing camera data of a network camera, comprising the steps of:
   (a) importing the camera data of the network camera;
   (b) splitting the imported camera data into a camera audio data and a camera video data based on the respective data formats, and storing, via a network, the camera audio data and the camera video data respectively in different servers and/or in different server storage areas having non-sequential storage addresses with each other in one server; and
   (c) retrieving, according to a retrieval condition, a fragment of the camera audio data and/or a fragment of the camera video data from the camera audio data and/or the camera video data stored in the servers and/or the server storage areas.

5. The network camera data management method as claimed in claim 4, wherein in the step (a), the camera data of the network camera is synchronously imported while the network camera is recording.

6. The network camera data management method as claimed in claim 4, further comprising, after the step (c), a step (d) of:
   merging the retrieved fragment of the camera audio data and the retrieved fragment of the camera video data into a fragment camera data.

7. The network camera data management method as claimed in claim 4, further comprising, after the step (c), a step (d) of:
   merging the retrieved fragments of the camera audio data into a continuous-time camera audio data, and/or
   merging the retrieved fragments of the camera video data into a continuous-time camera video data.

* * * * *